(12) United States Patent
Lee

(10) Patent No.: US 12,496,913 B2
(45) Date of Patent: Dec. 16, 2025

(54) APPARATUS AND METHOD FOR CONTROLLING VEHICLE

(71) Applicants: Hyundai Motor Company, Seoul (KR); Kia Corporation, Seoul (KR)

(72) Inventor: Jung Hun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 252 days.

(21) Appl. No.: 17/845,621

(22) Filed: Jun. 21, 2022

(65) Prior Publication Data

US 2023/0144284 A1 May 11, 2023

(30) Foreign Application Priority Data

Nov. 9, 2021 (KR) .......................... 10-2021-0153398

(51) Int. Cl.
*B60L 15/20* (2006.01)
*B60L 58/12* (2019.01)
*B60L 58/18* (2019.01)

(52) U.S. Cl.
CPC .......... *B60L 15/2045* (2013.01); *B60L 58/12* (2019.02); *B60L 58/18* (2019.02); *B60L 2240/28* (2013.01)

(58) Field of Classification Search
CPC ...... B60L 15/2045; B60L 58/12; B60L 58/18; B60L 2240/28; B60L 58/13; B60L 58/20; B60L 3/0046; Y02T 10/70; Y02T 10/7072; Y02T 90/10; H02J 7/00306; H02J 7/0048; G01R 31/382; B60Y 2200/91; B60R 16/033
See application file for complete search history.

(56) References Cited

U.S. PATENT DOCUMENTS

| 9,796,291 | B1 * | 10/2017 | Symanow ............... B60L 58/21 |
| 10,099,567 | B2 * | 10/2018 | Hernandez Cervantes ................. B60L 58/24 |
| 2005/0285445 | A1 * | 12/2005 | Wruck .................... H02J 9/002 307/10.1 |
| 2006/0028168 | A1 * | 2/2006 | Nishida ................. H02J 7/0031 320/106 |

(Continued)

FOREIGN PATENT DOCUMENTS

| DE | 102021103297 A1 * | 8/2021 | ............. B60R 16/03 |
| JP | 6487821 B2 * | 3/2019 | ................ B60L 1/00 |

(Continued)

OTHER PUBLICATIONS

Translation of KR-20170040923-A retrieved from Espacenet on Apr. 5, 2024 (Year: 2024).*

(Continued)

*Primary Examiner* — Thomas Ingram
*Assistant Examiner* — Faris Asim Shaikh
(74) *Attorney, Agent, or Firm* — MORGAN, LEWIS & BOCKIUS LLP

(57) ABSTRACT

An apparatus of controlling a vehicle includes a memory, a network interface, and a processor, wherein the processor is configured to transfer information related to a state of the vehicle to a battery sensor that measures a state of charge (SOC) value of an auxiliary battery of the vehicle and to control the battery sensor so that the battery sensor determines whether to transfer a request for auxiliary charge of the auxiliary battery, according to the information related to the state of the vehicle.

20 Claims, 10 Drawing Sheets

(56) References Cited

U.S. PATENT DOCUMENTS

| | | | | |
|---|---|---|---|---|
| 2008/0231232 | A1* | 9/2008 | Seo | H02J 7/0047 320/134 |
| 2010/0194340 | A1* | 8/2010 | Lim | H01M 10/486 320/128 |
| 2010/0213891 | A1* | 8/2010 | Nishikawa | H01M 10/42 320/106 |
| 2010/0228413 | A1* | 9/2010 | Fujitake | B60W 20/10 180/65.265 |
| 2010/0302050 | A1* | 12/2010 | Kang | H02J 7/35 320/152 |
| 2011/0025265 | A1* | 2/2011 | Mochida | G06K 19/0701 320/108 |
| 2011/0168462 | A1* | 7/2011 | Stanek | B60L 53/14 320/109 |
| 2011/0187312 | A1* | 8/2011 | Yamamoto | H01M 10/44 320/101 |
| 2012/0038325 | A1* | 2/2012 | Morita | H02J 7/0014 320/149 |
| 2012/0286575 | A1* | 11/2012 | Park | B60L 58/15 307/31 |
| 2013/0169221 | A1* | 7/2013 | Suzuki | H02J 7/0047 320/108 |
| 2013/0314048 | A1* | 11/2013 | Washiro | H01M 10/425 320/128 |
| 2014/0253041 | A1* | 9/2014 | Takeda | H01M 10/42 320/134 |
| 2015/0077040 | A1* | 3/2015 | Longdon | H02J 7/00714 320/162 |
| 2015/0115898 | A1* | 4/2015 | Yung | H02J 7/342 320/152 |
| 2015/0200560 | A1* | 7/2015 | Oh | H02J 7/0047 320/164 |
| 2015/0251544 | A1* | 9/2015 | Sugiyama | B60L 3/00 307/10.6 |
| 2016/0053887 | A1* | 2/2016 | Moorman | F16H 59/44 701/29.2 |
| 2016/0084916 | A1* | 3/2016 | Kim | G01R 31/387 324/426 |
| 2016/0111908 | A1* | 4/2016 | Kwark | H02J 7/007 324/426 |
| 2016/0118821 | A1* | 4/2016 | Takeda | H02J 7/0031 320/134 |
| 2016/0156200 | A1* | 6/2016 | Kim | H02J 50/20 307/104 |
| 2017/0005490 | A1* | 1/2017 | Saito | H02J 7/0031 |
| 2017/0008408 | A1* | 1/2017 | Park | B60L 58/20 |
| 2017/0021737 | A1* | 1/2017 | Park | B60L 58/12 |
| 2017/0033574 | A1* | 2/2017 | Imaizumi | H02J 7/00304 |
| 2017/0096076 | A1* | 4/2017 | Hernandez Cervantes | H02J 7/007182 |
| 2017/0166076 | A1* | 6/2017 | Yoon | H02J 7/0013 |
| 2017/0197521 | A1* | 7/2017 | Park | H02J 7/00306 |
| 2018/0241099 | A1* | 8/2018 | Watanabe | H01M 8/04947 |
| 2018/0354386 | A1* | 12/2018 | Lee | B60L 53/20 |
| 2019/0070972 | A1* | 3/2019 | Lee | B60W 10/26 |
| 2019/0296581 | A1* | 9/2019 | Onishi | H02J 7/00 |
| 2020/0130525 | A1* | 4/2020 | Son | H02J 7/35 |
| 2020/0287390 | A1* | 9/2020 | Lee | H01M 10/486 |
| 2020/0338996 | A1* | 10/2020 | Jang | H02J 9/061 |
| 2022/0190400 | A1* | 6/2022 | Lee | H01M 50/548 |
| 2023/0336006 | A1* | 10/2023 | Kobayashi | H02J 7/06 |
| 2024/0044995 | A1* | 2/2024 | Bae | H01M 10/425 |

FOREIGN PATENT DOCUMENTS

| | | | | |
|---|---|---|---|---|
| KR | 20150130671 A | * | 11/2015 | B60L 50/66 |
| KR | 101628552 B1 | * | 6/2016 | B60L 11/18 |
| KR | 20160126338 A | * | 11/2016 | B60L 11/18 |
| KR | 20170040923 A | * | 4/2017 | B60L 11/18 |
| KR | 20210083877 A | * | 7/2021 | B60K 16/00 |

OTHER PUBLICATIONS

Translation of KR-20210083877-A retrieved from Espacenet on Apr. 5, 2024 (Year: 2024).*

Translation of DE-102021103297-A1 retrieved from Espacenet on Apr. 5, 2024 (Year: 2024).*

Translation of KR-20160126338-A retrieved from Google Patents on Apr. 6, 2024 (Year: 2024).*

Translation of KR-101628552-B1 retrieved from Espacenet on Apr. 6, 2024 (Year: 2024).*

Translation of JP-6487821-B2 retrieved from PE2E Search on Apr. 6, 2024 (Year: 2024).*

This is the Platform Future Hyundai and Kia EVs Will Ride On—The Car Guide (Year: 2020).*

Translation of KR20150130671A retrieved from Espacenet on Jun. 10, 2025 (Year: 2025).*

* cited by examiner

| CLASSIFICATION | CURRENT AUXILIARY CHARGE CONTROL LOGIC | REGULAR AUXILIARY CHARGE LOGIC |
|---|---|---|
| CONTROL LOGIC | MAKE ENTRANCE TO AUXILIARY CHARGE WHEN IGNITION IS TURNED OFF OR WHEN ENTRANCE CONDITION IS SATISFIED AFTER CHECK ON STATE OF 12-V BATTERY THROUGH WAKE-UP EVERY 24 HOURS AFTER CHARGING (FAST/SLOW) | IBS REQUESTS AUXILIARY CHARGE FROM ICU WHEN SOC OF 12-V BATTERY IS 80% OR LESS, AND ICU DETERMINES VEHICLE STATE IN WHICH ENTRANCE TO AUXILIARY CHARGE IS POSSIBLE AND ENTERS AUXILIARY CHARGE IF POSSIBLE |
| ENTRANCE CONDITION | ① MAIN BATTERY: 20% OR MORE<br>② All Door & Hood, Trunk, S/Roof: Close<br>③ 12V Battery: SOC 85% or VOLTAGE OF 12.7V OR LESS | WHEN ICU IDENTIFIES VEHICLE STATE (NOTE 1) AND DETERMINES THAT AUXILIARY CHARGE IS POSSIBLE, 12-V BATTERY IS CHARGED<br>IBS REQUESTS CHARGE FROM ICU WHEN ① OR ② IS SATISFIED<br>PREMISE: EXISTENCE OF IBS RE-CAL PERFORMANCE HISTORY WITHIN 1 WEEK<br>①SOC OF 80% OR LESS & RE-ENTRY FLAG = OFF<br>②SOC OF 80% OR LESS, RE-ENTRY FLAG = ON, & WHEN TOTAL CHARGE/DISCHARGE AMOUNT IS 5% OR MORE OF BATTERY CAPACITY, COMPARED TO SOC AT END TIME OF PREVIOUS AUXILIARY CHARGE<br>IDENTIFY DETAILED CONDITION FOR VEHICLE STATE CHECK THROUGH ICU AND RELATED COOPERATIVE CONTROLLER<br>- MAIN BATTERY SOC OF 30% OR MORE<br>- IBS REQUESTS CHARGE<br>- HOOD Close<br>- B+, NON-START IGN ON STATE, (CHARGING IS NOT POSSIBLE IN ACC DUE TO NON-OPERATION OF LDC)<br>- WHEN OTA DOES NOT OPERATE<br>└ WHEN OTA OPERATES, 12-V BATTERY IS CHARGED USING SEPARATE AUXILIARY CHARGE LOGIC / IT IS NOT AUXILIARY CHARGE CONDUCTED BY IBS |
| OPERATING TIME | ① 12V battery SOC OF MORE THAN 80% / UP TO 20 MINUTES<br>② 12V battery SOC OF 80% OR LESS / UP TO 60 MINUTES | AUXILIARY CHARGE IS ENDED WHEN ONE OF ① TO ④ IS SATISFIED<br>②WHEN LIN COMMUNICATION IS TURNED OFF<br>③WHEN 92% IS REACHED<br>④WHEN MAXIMUM CHARGING LIMIT TIME SET DEPENDING ON SOC AT CHARGING ENTRY POINT IS REACHED<br>- SOC 71~: 1HR<br>- SOC 61~70%: 2HR<br>- SOC 51~60%: 3HR<br>- SOC 41~50%: 4HR<br>- BELOW: 5HR (50% DoD UNIT DURABILITY TEST, CHARGING TIME CONDITION)) |

FIG.9

APPARATUS AND METHOD FOR CONTROLLING VEHICLE

CROSS-REFERENCE TO RELATED APPLICATION

The present application claims priority to Korean Patent Application No. 10-2021-0153398, filed on Nov. 9, 2021, the entire contents of which is incorporated herein for all purposes by this reference.

BACKGROUND OF THE PRESENT DISCLOSURE

Field of the Present Disclosure

The present disclosure relates to an apparatus and method for controlling a vehicle, and more particularly, relates to a technology for controlling a vehicle to reduce unnecessary power consumption of a battery of the vehicle.

DESCRIPTION OF RELATED ART

Recently, an electric vehicle driven by electricity has been developed. The electric vehicle may travel using electric power stored in a battery and may control modules inside the vehicle. The battery of the electric vehicle may include a main battery and an auxiliary battery. The main battery may supply power to vehicle wheels of the electric vehicle to allow the electric vehicle to travel. The auxiliary battery of the electric vehicle may supply electric power to power electronic portions of the electric vehicle to allow the modules inside the electric vehicle to operate.

To prevent the auxiliary battery of the vehicle from being discharged, auxiliary charge may be performed on the auxiliary battery. When the state of charge value of the main battery of the vehicle is greater than or equal to a specified value, the auxiliary charge may be performed in accordance with the state of charge of the auxiliary battery.

When the state of charge of the auxiliary battery of the vehicle is less than a minimum threshold value, the auxiliary charge may be started. The auxiliary charge may be stopped when the state of charge of the auxiliary battery is greater than or equal to a maximum threshold value while the auxiliary charge of the auxiliary battery is performed.

The auxiliary charge of the auxiliary battery of the vehicle may not be able to be performed in accordance with the state of the trunk of the vehicle, the state of the hood of the vehicle, and the state of the high-voltage battery of the vehicle. The auxiliary charge may not be able to be performed in the state in which the trunk or hood of the vehicle is open in a special situation such as vehicle maintenance. Furthermore, the auxiliary charge may not be able to be performed in the state in which the remaining capacity of the high-voltage battery of the vehicle is low. In the case of requesting auxiliary charge in the state in which the trunk or hood of the vehicle is open, a vehicle control apparatus may be woken up to perform the auxiliary charge. The auxiliary battery of the vehicle may wake up the vehicle control apparatus while consuming a specified amount of power. The vehicle control apparatus, after woken up, may recognize that the vehicle state corresponds to a state in which the auxiliary charge is impossible. The auxiliary battery of the vehicle may unnecessarily consume power while waking up the vehicle control apparatus.

Furthermore, a vehicle in which a predetermined percentage or more of power is consumed to wake up a vehicle control apparatus may wake up the vehicle control apparatus again while requesting auxiliary charge again immediately after the vehicle control apparatus enters a sleep state. When the trunk or hood of the vehicle in which a predetermined percentage or more of power is consumed to wake up the vehicle control apparatus is maintained in an open state, the vehicle control apparatus may be repeatedly woken up in response to repeated requests for auxiliary charge, and therefore the auxiliary battery of the vehicle may be discharged.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a technology for reducing unnecessary power consumption occurring when a vehicle control apparatus is woken up in response to an unnecessary request for auxiliary charge.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus of controlling a vehicle includes a memory, a network interface, and a processor, and the processor is configured to transfer information related to a state of the vehicle to a battery sensor that measures a state of charge (SOC) value of an auxiliary battery of the vehicle and to control the battery sensor so that the battery sensor determines whether to transfer a request for auxiliary charge of the auxiliary battery, according to the information related to the state of the vehicle.

In an exemplary embodiment of the present disclosure, the information related to the state of the vehicle may include a state of a trunk of the vehicle, a state of a hood of the vehicle, and a state of the remaining capacity of the battery included in a state of charge (SOC) value of a main battery of the vehicle.

In an exemplary embodiment of the present disclosure, the processor may control the battery sensor so that the battery sensor postpones transferring the request for the auxiliary charge when a trunk of the vehicle is open, a hood of the vehicle is open, or the remaining capacity of a main battery of the vehicle is lower than a reference level which is a minimum level at which the auxiliary charge is possible.

In an exemplary embodiment of the present disclosure, the processor may determine whether the state of charge of the auxiliary battery of the vehicle is less than or equal to a minimum threshold value, whether a trunk of the vehicle is closed, whether a hood of the vehicle is closed, and whether a state of charge (SOC) value of a main battery of the vehicle is higher than or equal to a reference level which is a minimum threshold value at which the auxiliary charge is possible.

In an exemplary embodiment of the present disclosure, the processor may receive information related to a state of charge from an integrated central control unit (ICU) and may control an integrated charging control unit (ICCU) to start the auxiliary charge of the auxiliary battery of the vehicle by controlling the ICCU using the information related to the state of charge.

In an exemplary embodiment of the present disclosure, the processor may transfer information related to a state of the vehicle to the battery sensor configured to block transfer of the request for the auxiliary charge to an ICU or the apparatus when a trunk of the vehicle is open, a hood of the vehicle is open, or a state of charge (SOC) value of a main battery of the vehicle is lower than a reference level.

In an exemplary embodiment of the present disclosure, through current auxiliary charge control logic, the processor may make an entrance to the auxiliary charge when an ignition of the vehicle is turned off or when an entrance condition is satisfied after a check on a state of the auxiliary battery through wake-up every 24 hours after charging.

In an exemplary embodiment of the present disclosure, the entrance condition in the current auxiliary charge control logic may include a state in which all doors of the vehicle, a hood of the vehicle, a trunk of the vehicle, and a sunroof of the vehicle are closed and a state in which a state of charge (SOC) value of a main battery of the vehicle is higher than or equal to a reference level.

In an exemplary embodiment of the present disclosure, the processor may receive the request for the auxiliary charge from the battery sensor when the state of charge of the auxiliary battery is 80% or less and a re-entry flag is turned off and may receive the request for the auxiliary charge from the battery sensor when the state of charge of the auxiliary battery is 80% or less, the re-entry flag is turned on, and the auxiliary battery is discharged by 5% or more, compared to the state of charge of the auxiliary battery at an end time point of previous auxiliary charge.

In an exemplary embodiment of the present disclosure, the processor may end the auxiliary charge when communication of the battery sensor is turned off, the state of charge of the auxiliary battery reaches 92%, or a maximum charging limit time set for each charging state section is reached.

According to another aspect of the present disclosure, a method for controlling a vehicle includes transferring, by a processor of a vehicle control apparatus, information related to a state of the vehicle to a battery sensor that measures a state of charge (SOC) value of an auxiliary battery of the vehicle and controlling, by the processor, the battery sensor determine whether to transfer a request for auxiliary charge of the auxiliary battery, according to the information related to the state of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 9 is a view exemplarily illustrating conditions for start and stop of auxiliary charge according to an exemplary embodiment of the present disclosure.

Figure 1:
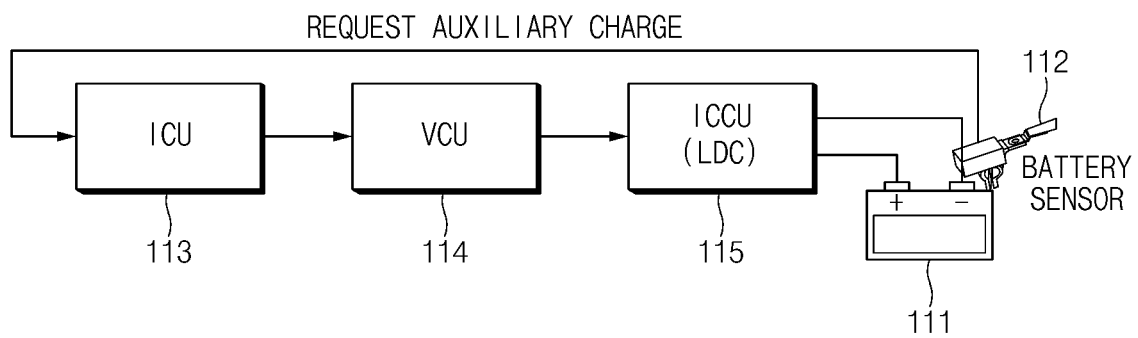
FIG. 1 is a view exemplarily illustrating a configuration in which a vehicle control apparatus performs regular auxiliary charge on an auxiliary battery.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIG. 1, FIG. 2, FIG. 3, FIG. 4, FIG. 5, FIG. 6, FIG. 7, FIG. 8 and FIG. 9.

FIG. 1 is a view exemplarily illustrating a configuration in which a vehicle control apparatus performs regular auxiliary charge on an auxiliary battery.

The auxiliary battery 111 may supply power to power electronic parts of a vehicle to allow modules inside the vehicle to operate.

An intelligent battery sensor (IBS) 112 may measure the state of charge value of the auxiliary battery 111. The intelligent battery sensor 112 may transfer the measured SOC to an integrated central control unit (ICU) 113.

The ICU 113 may transfer information related to the SOC to a vehicle control unit (VCU) 114.

The VCU 114 may control an integrated charging control unit (ICCU) 115 using the information related to the SOC. When the SOC value of the auxiliary battery 111 is less than a minimum threshold value, the VCU 114 may control the ICCU 115 so that the ICCU 115 starts auxiliary charge of the auxiliary battery 111. When the SOC value of the auxiliary battery 111 reaches a maximum threshold value or more while the ICCU 115 performs the auxiliary charge of the auxiliary battery 111, the VCU 114 may control the ICCU 115 to stop the auxiliary charge.

The ICCU 115 may be implemented with a low-voltage DC-DC converter (LDC). The ICCU 115 may be connected to a positive (+) terminal and a negative (−) terminal of the auxiliary battery 111. The ICCU 115 may perform the auxiliary charge of the auxiliary battery 111.

When the vehicle is an electric vehicle, regular auxiliary charge may be applied to the auxiliary battery 111 of the vehicle. When the SOC value of the main battery of the vehicle is greater than or equal to a specified value, auxiliary charge may be performed on the auxiliary battery 111 which is at a low SOC.

The regular auxiliary charge may be started when the SOC value of the auxiliary battery 111 is less than 80%. The regular auxiliary charge may be stopped when the SOC value of the auxiliary battery 111 is greater than or equal to 92%. In the case where auxiliary charge is ended at 75% due to battery aging, an entrance to the auxiliary charge may be made again when the SOC value of the auxiliary battery 111 reaches 70%. To make the entrance to the auxiliary charge again, 5% of the SOC value of the auxiliary battery 111 may be consumed.

Hereinafter, it is assumed that the vehicle control apparatus performs the processes of FIGS. 2, 5, and 7. Furthermore, in the descriptions of FIGS. 2, 5, and 7, operations referred to as being performed by the vehicle control apparatus may be understood as being controlled by a processor of the vehicle control apparatus (e.g., a processor 1100 of FIG. 10).

Figure 2:
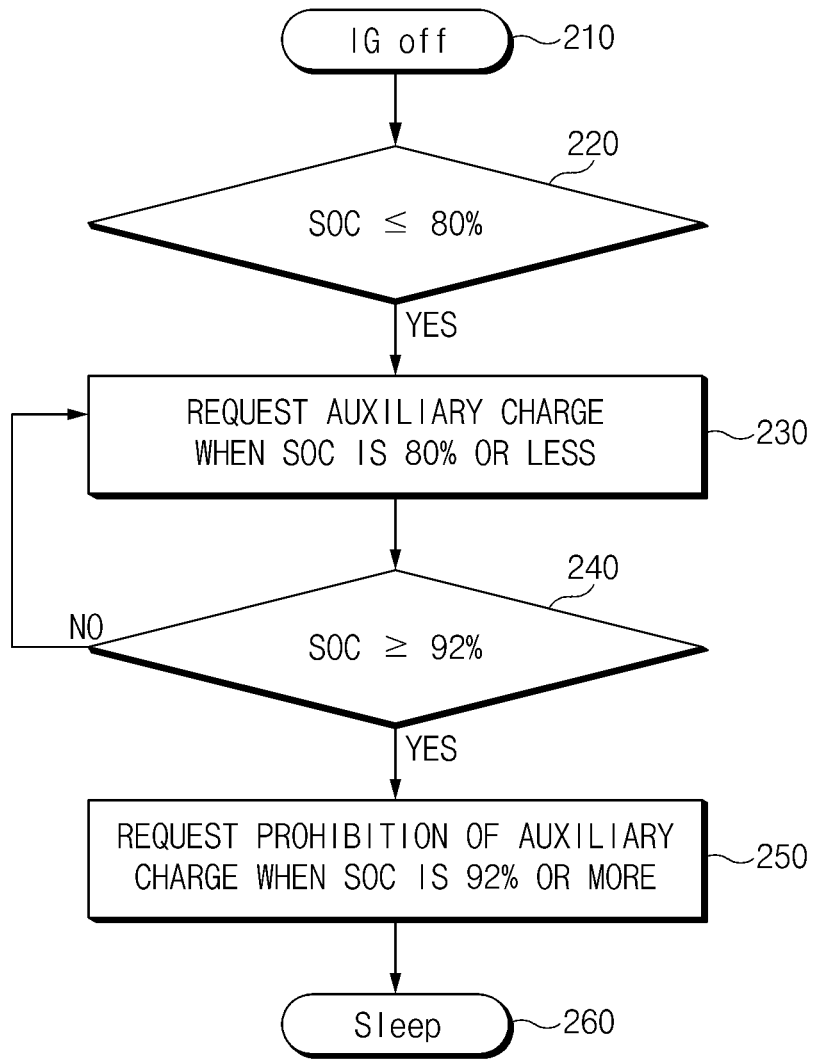
FIG. 2 is a flowchart illustrating a method in which the vehicle control apparatus performs regular auxiliary charge on the auxiliary battery.

FIG. 2 is a flowchart illustrating a method in which the vehicle control apparatus performs regular auxiliary charge on the auxiliary battery.

In operation 210, the vehicle control apparatus may perform IG off to turn off the ignition of the vehicle and stop the engine of the vehicle.

In operation 220, the vehicle control apparatus may determine whether the SOC value of the auxiliary battery of the vehicle is 80% or less. 80% may be the minimum threshold value of the SOC value of the auxiliary battery. The battery sensor of the vehicle may monitor the state of the auxiliary battery and may determine whether the SOC value of the auxiliary battery is lower than the minimum threshold value. The vehicle control apparatus may proceed to operation 230 when the SOC value of the auxiliary battery of the vehicle is 80% or less (operation 220—YES).

In operation 230, the vehicle control apparatus may request auxiliary charge of the auxiliary battery in response to the SOC value of the auxiliary battery which is 80% or less. The battery sensor may wake up a master controller, such as the ICU, through an in-vehicle network such as a local interconnect network (LIN). The ICU may transfer the request for the auxiliary charge to the vehicle control apparatus collectively referred to as the VCU. The vehicle control apparatus may control a charging control apparatus, such as the ICCU (LDC), to start the auxiliary charge of the auxiliary battery.

In operation 240, the vehicle control apparatus may determine whether the SOC value of the auxiliary battery is 92% or more. 92% may be the maximum threshold value of the SOC value of the auxiliary battery. The vehicle control apparatus may proceed to operation 250 when the SOC value of the auxiliary battery of the vehicle is 92% or more (operation 240—YES). The vehicle control apparatus may return to operation 230 when the SOC value of the auxiliary battery of the vehicle is less than 92%. When the SOC value of the auxiliary battery of the vehicle is less than 92%, the vehicle control apparatus may control the charging control apparatus to continue to perform the auxiliary charge of the auxiliary battery.

In operation 250, the vehicle control apparatus may request prohibition of the auxiliary charge of the auxiliary battery in response to the SOC value of the auxiliary battery which is 92% or more. The vehicle control apparatus may control the charging control apparatus to stop the auxiliary charge of the auxiliary battery.

In operation 260, the vehicle control apparatus may enter a sleep state. In the state in which the auxiliary charge of the auxiliary battery is stopped, the vehicle control apparatus may remain in the sleep state. When the auxiliary battery is discharged by a predetermined percentage or more in the state in which the auxiliary charge is completed, the battery sensor may request auxiliary charge again. The predetermined percentage may be 5%. For example, in the case where the auxiliary charge of the auxiliary battery is finally completed in the SOC value of 75%, the battery sensor may request auxiliary charge again to form an entrance to the auxiliary charge again when the SOC value of the auxiliary battery is 70%.

Figure 3:
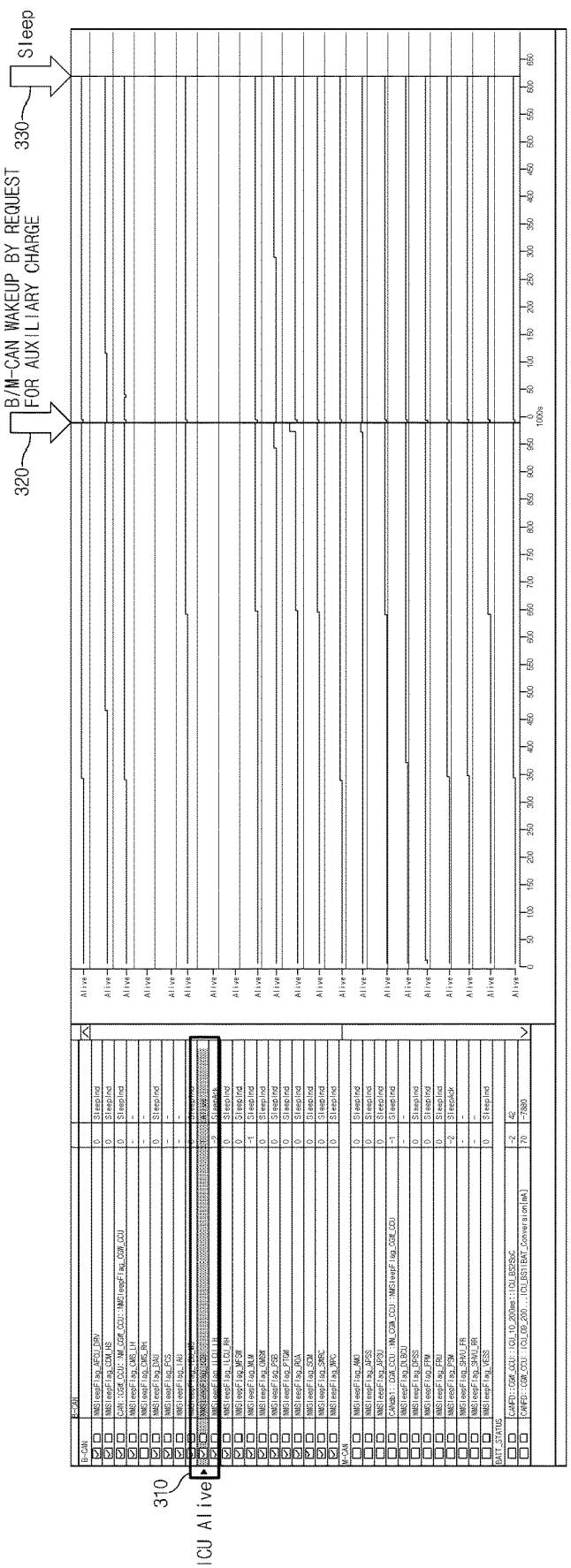
FIG. 3 is a view exemplarily illustrating an operation of waking up the vehicle control apparatus in response to a request for auxiliary charge in the state in which a trunk of a vehicle is open, a hood of the vehicle is open, or the remaining capacity of a high-voltage battery of the vehicle is lower than a reference level.

FIG. 3 is a view exemplarily illustrating an operation of waking up the vehicle control apparatus in response to a request for auxiliary charge in the state in which the trunk of the vehicle is open, the hood of the vehicle is open, or the remaining capacity of a high-voltage battery of the vehicle is lower than a reference level.

Generally, the ICU determines whether the trunk of the vehicle is open due to a situation such as vehicle maintenance, whether the hood of the vehicle is open, or whether the remaining capacity of the high-voltage battery of the vehicle is high. The reference level may be a minimum level at which auxiliary charge is possible. The reference level may be a minimum threshold value at which auxiliary charge is possible during the state of charge of the high-voltage battery of the vehicle. The battery sensor transfers a request for auxiliary charge to the ICU when the SOC value of the auxiliary battery is less than or equal to the minimum threshold value even in the state in which the trunk or hood of the vehicle is open. Accordingly, the ICU is woken up or alive by the request for the auxiliary charge which is transferred from the battery sensor (310). When the request for the auxiliary charge is transferred from the battery sensor the ICU, a controller (B/M-CAN) connecting the battery sensor and a communication device is woken up (320). The controller may be a module or domain included in the vehicle control apparatus. The woken-up ICU may determine that the auxiliary charge cannot be performed, because the trunk of the vehicle is open, the hood of the vehicle is open, or the remaining capacity of the high-voltage battery of the vehicle is low. After determining that the auxiliary charge cannot be performed, the controller may switch a network to a sleep state (330).

Generally, when the request for the auxiliary charge is transferred from the battery sensor the ICU, the controller which is included in the vehicle control apparatus and that connects the battery sensor and the communication device is woken up (320). The power of the auxiliary battery of the vehicle may be unnecessarily consumed to wake up the controller belonging to the vehicle control apparatus (320).

Figure 4:
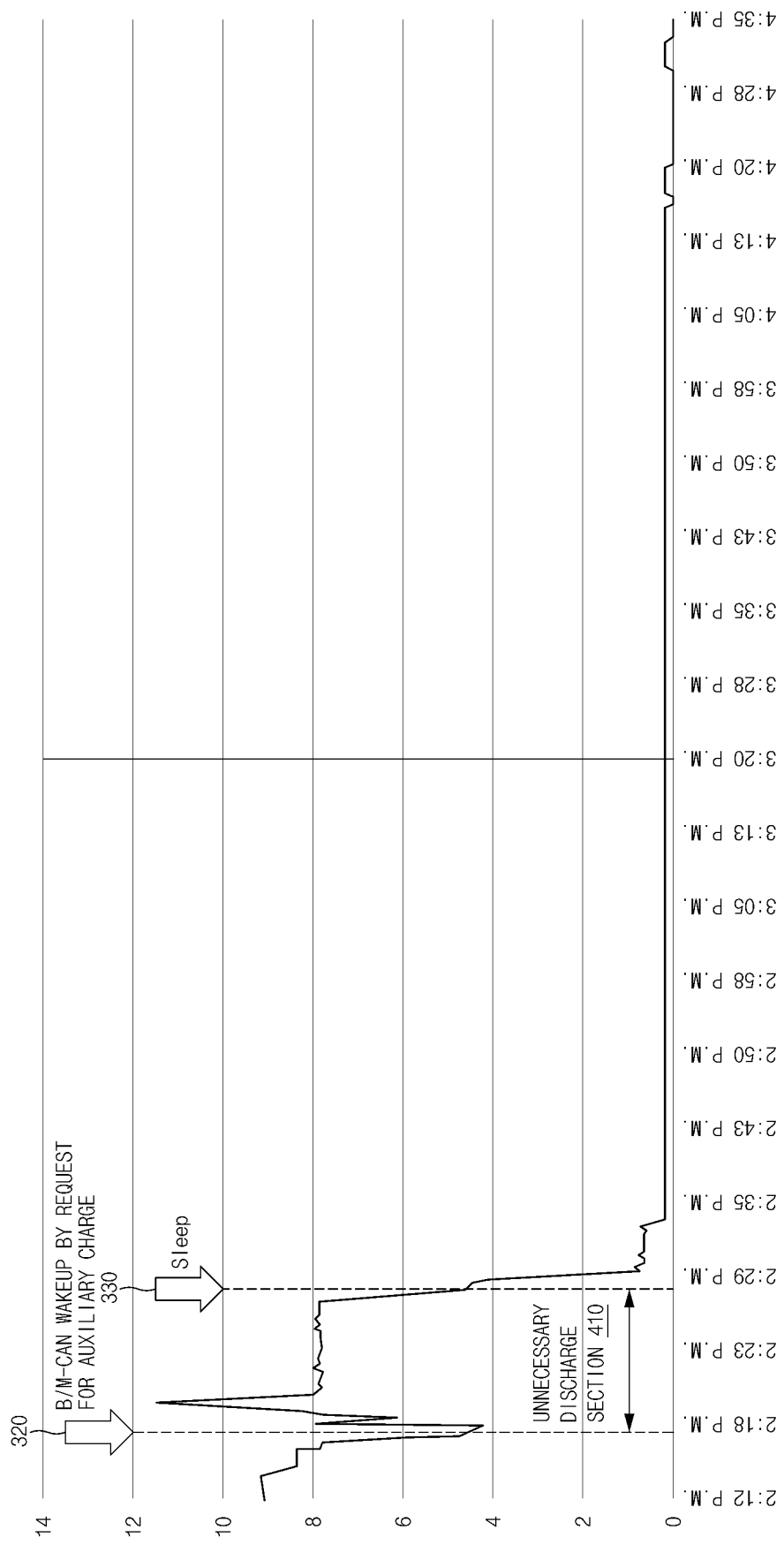
FIG. 4 is a view exemplarily illustrating power consumption of the auxiliary battery when auxiliary charge is requested in the state in which the trunk of the vehicle is open, the hood of the vehicle is open, or the remaining capacity of the high-voltage battery of the vehicle is lower than the reference level.

FIG. 4 is a view exemplarily illustrating power consumption of the auxiliary battery when auxiliary charge is requested in the state in which the trunk of the vehicle is open, the hood of the vehicle is open, or the remaining capacity of the high-voltage battery of the vehicle is lower than the reference level.

In the state in which the trunk of the vehicle is open, the hood of the vehicle is open, or the remaining capacity of the high-voltage battery of the vehicle is low, the ICU and the controller (B/M-CAN) may be woken up by the request for the auxiliary charge (320). An unnecessary discharge section 410 in which the power of the auxiliary battery of the vehicle is unnecessarily consumed may occur until the woken-up ICU switches the network to the sleep state (330) after determining that the auxiliary charge cannot be performed.

Figure 5:
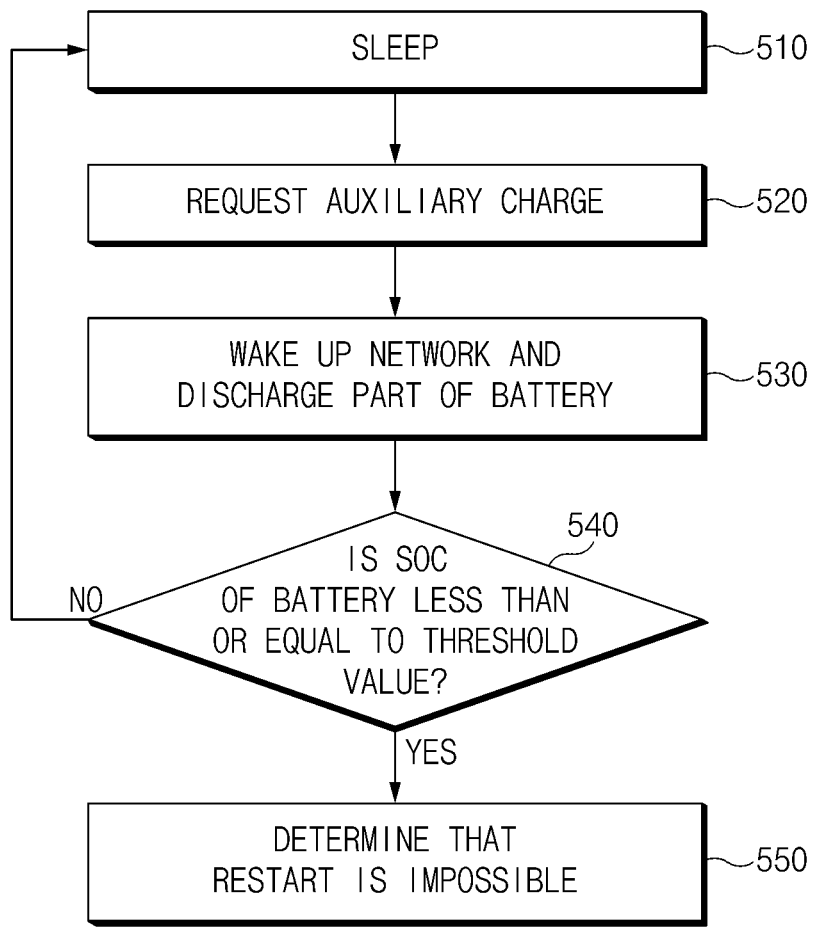
FIG. 5 is a view exemplarily illustrating an operation of requesting auxiliary charge in the state in which the trunk of the vehicle is open, the hood of the vehicle is open, or the remaining capacity of the high-voltage battery of the vehicle is lower than the reference level.

FIG. 5 is a view exemplarily illustrating an operation of requesting auxiliary charge in the state in which the trunk of the vehicle is open, the hood of the vehicle is open, or the remaining capacity of the high-voltage battery of the vehicle is lower than the reference level.

In operation 510, the vehicle control apparatus may enter a sleep state.

In operation 520, the vehicle control apparatus may receive a request for auxiliary charge.

In operation 530, the vehicle control apparatus may wake up the network. Even in the state in which the trunk of the vehicle is open, the hood of the vehicle is open, or the remaining capacity of the high-voltage battery of the vehicle is low, the ICU and an associated network controller may be woken up by the request for the auxiliary charge.

In operation 530, the vehicle control apparatus may partially discharge the battery. The auxiliary battery of the vehicle may be used until the network enters a sleep state after woken up in response to the request for the auxiliary charge. In the case where the amount by which the auxiliary battery of the vehicle is used until the network enters the sleep state is greater than or equal to a threshold value, the battery sensor may request auxiliary charge again at the time when the network enters the sleep state. The battery sensor may request auxiliary charge again when the amount by which the auxiliary battery of the vehicle is used exceeds 5% of the capacity of the auxiliary battery.

In operation 540, the vehicle control apparatus may determine whether the SOC value of the battery is less than or equal to a threshold value. The vehicle control apparatus may proceed to operation 550 when the SOC value of the battery is less than or equal to the threshold value (operation 540—YES). The vehicle control apparatus may return to operation 510 when the SOC value of the battery is greater than the threshold value. When the amount by which the auxiliary battery of the vehicle is used is greater than or equal to the threshold value, the vehicle control apparatus may repeatedly receive a request for auxiliary charge.

In operation 550, the vehicle control apparatus may determine that restart is impossible. When the auxiliary battery is used in response to a continuous request for auxiliary charge, the auxiliary battery may be discharged, and restart may be impossible.

Figure 6:
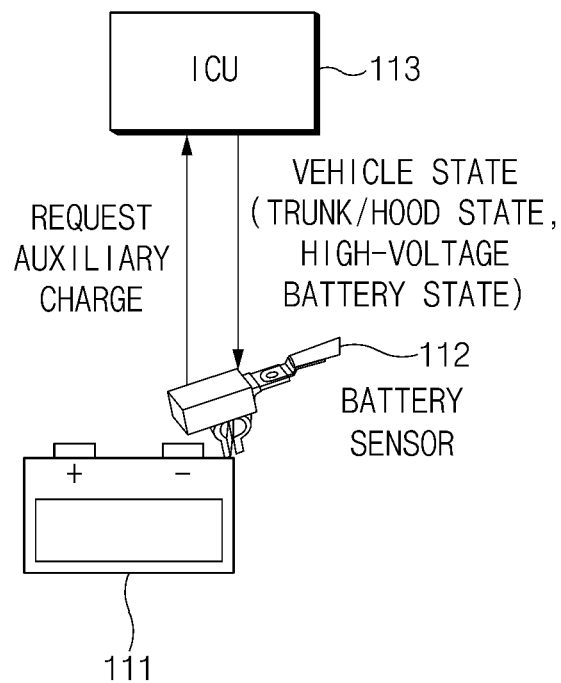
FIG. 6 is a view exemplarily illustrating a configuration in which the vehicle control apparatus performs auxiliary charge on the auxiliary battery based on a vehicle state according to an exemplary embodiment of the present disclosure.

FIG. 6 is a view exemplarily illustrating a configuration in which the vehicle control apparatus performs auxiliary charge on the auxiliary battery based on a vehicle state according to an exemplary embodiment of the present disclosure.

The auxiliary battery 111 of the vehicle may supply power to power electronic portions of the vehicle to allow modules inside the vehicle to operate.

The battery sensor 112 may measure the SOC value of the auxiliary battery 111. The battery sensor 112 may transfer the measured SOC to the ICU 113. The battery sensor 112 may transfer a request for auxiliary charge to the ICU 113. The vehicle control apparatus may be woken up when the battery sensor 112 transfers the request for the auxiliary charge to the ICU 113. The ICU 113 may transfer information related to the SOC to the vehicle control apparatus. The vehicle control apparatus may receive the information related to the SOC from the ICU 113.

The vehicle control apparatus may transfer information related to the state of the vehicle to the ICU 113. The information related to the state of the vehicle may include the state of the trunk of the vehicle, the state of the hood of the vehicle, and the state of charge value of the high-voltage battery of the vehicle. The vehicle control apparatus may transfer the state of the trunk of the vehicle, the state of the hood of the vehicle, and the SOC value of the high-voltage battery of the vehicle to the ICU 113. The vehicle control apparatus may transfer, to the ICU 113, whether the trunk of the vehicle is open, whether the hood of the vehicle is open, and whether the SOC value of the high-voltage battery of the vehicle is higher than or equal to a reference level which is a minimum level at which auxiliary charge is possible.

The ICU 113 may transfer the information related to the state of the vehicle to the battery sensor 112. The ICU 113 may transfer the state of the trunk of the vehicle or the state of the hood of the vehicle to the battery sensor 112. The ICU 113 may transfer, to the battery sensor 112, whether the trunk of the vehicle is open, whether the hood of the vehicle is open, and whether the remaining capacity of the high-voltage battery of the vehicle is higher than or equal to the reference level, which is the minimum level at which auxiliary charge is possible, so that auxiliary charge to the high-voltage battery is possible.

The vehicle control apparatus may control the battery sensor 112 so that the battery sensor 112 determines whether to transfer the request for the auxiliary charge of the auxiliary battery 111, according to the information related to the state of the vehicle. The vehicle control apparatus may control the battery sensor 112 to postpone the transfer of the request for the auxiliary charge when the trunk of the vehicle is open, the hood of the vehicle is open, or the remaining capacity of the high-voltage battery of the vehicle is lower than the reference level. The battery 112 may postpone the transfer of the request for the auxiliary charge to the ICU 113 or the vehicle control apparatus when the trunk of the vehicle is open, the hood of the vehicle is open, or the remaining capacity of the high-voltage battery of the vehicle is lower than the reference level.

The vehicle control apparatus may transfer the information related to the state of the vehicle to the battery sensor 112 to block the transfer of the request for the auxiliary charge to the ICU 113 or the vehicle control apparatus when the trunk of the vehicle is open, the hood of the vehicle is open, or the remaining capacity of the high-voltage battery of the vehicle is lower than the reference level. The vehicle control apparatus may transfer the information related to the state of the vehicle to the battery sensor 112 to prevent wake-up in relation to the request for the auxiliary charge when the trunk of the vehicle is open, the hood of the vehicle is open, or the remaining capacity of the high-voltage battery of the vehicle is lower than the reference level. The vehicle control apparatus may block an unnecessary request for auxiliary charge by the battery sensor 112. The vehicle control apparatus may block wake-up by an unnecessary request for auxiliary charge and may thus reduce unnecessary power consumption of the auxiliary battery.

Figure 7:
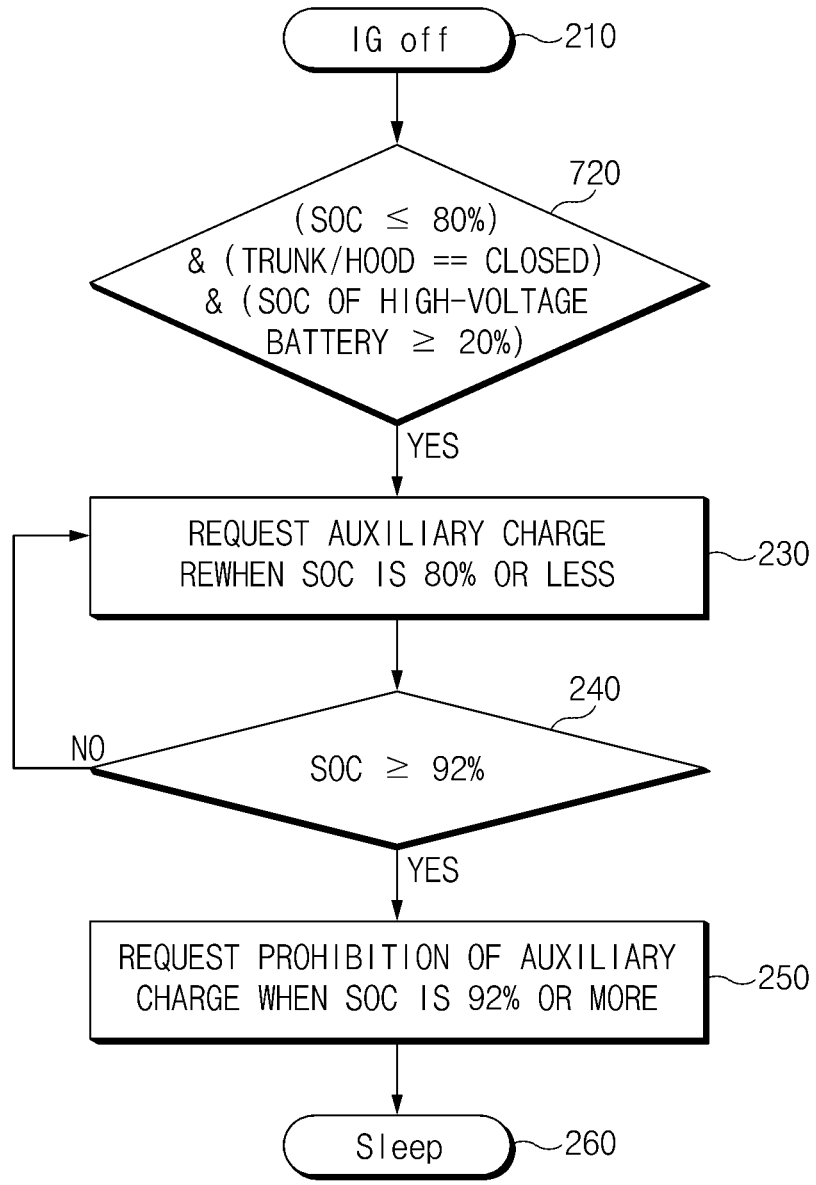
FIG. 7 is a flowchart illustrating a method of performing, by the vehicle control apparatus, auxiliary charge on the auxiliary battery based on a vehicle state according to an exemplary embodiment of the present disclosure.

FIG. 7 is a flowchart illustrating a method of performing, by the vehicle control apparatus, auxiliary charge on the auxiliary battery based on a vehicle state according to an exemplary embodiment of the present disclosure.

In operation 210, the vehicle control apparatus may perform IG off to turn off the ignition of the vehicle and stop the engine of the vehicle.

In operation 720, the vehicle control apparatus may determine whether the SOC value of the auxiliary battery of the vehicle is 80% or less, whether the trunk of the vehicle is closed, whether the hood of the vehicle is closed, and whether the remaining capacity of the high-voltage battery of the vehicle is higher than a reference level. 80% may be the minimum threshold value of the SOC value of the auxiliary battery. 20% may be the reference level of the high-voltage battery of the vehicle. The battery sensor of the vehicle may monitor the state of the auxiliary battery and may determine whether the SOC value of the auxiliary battery is lower than the minimum threshold value. The vehicle control apparatus may detect whether the trunk or hood of the vehicle is closed. The vehicle control apparatus may transfer, to the battery sensor, whether the trunk of the vehicle is closed, whether the hood of the vehicle is closed, and whether the remaining capacity of the high-voltage battery of the vehicle is able to be replenished. The vehicle control apparatus may proceed to operation 230 when the SOC value of the auxiliary battery of the vehicle is 80% or less, the SOC value of the high-voltage battery of the vehicle is 20% or more, and the trunk or hood of the vehicle is in a closed state (operation 220—YES).

In operation 230, the vehicle control apparatus may request auxiliary charge of the auxiliary battery in response to the SOC value of the auxiliary battery which is 80% or less. The battery sensor may wake up the master controller, such as the ICU, through an in-vehicle network such as a local interconnect network (LIN). The ICU may transfer the request for the auxiliary charge to the vehicle control apparatus collectively referred to as the VCU. The vehicle control apparatus may control the charging control apparatus, such as the ICCU (LDC), to start the auxiliary charge of the auxiliary battery.

In operation 240, the vehicle control apparatus may determine whether the SOC value of the auxiliary battery is 92% or more. 92% may be the maximum threshold value of the SOC value of the auxiliary battery. The vehicle control apparatus may proceed to operation 250 when the SOC value of the auxiliary battery of the vehicle is 92% or more (operation 240—YES). The vehicle control apparatus may return to operation 230 when the SOC value of the auxiliary battery of the vehicle is less than 92%. When the SOC value of the auxiliary battery of the vehicle is less than 92%, the vehicle control apparatus may control the charging control apparatus to continue to perform the auxiliary charge of the auxiliary battery.

In operation 250, the vehicle control apparatus may request prohibition of the auxiliary charge of the auxiliary battery in response to the SOC value of the auxiliary battery which is 92% or more. The vehicle control apparatus may control the charging control apparatus to stop the auxiliary charge of the auxiliary battery.

In operation 260, the vehicle control apparatus may enter a sleep state. In the state in which the auxiliary charge of the auxiliary battery is stopped, the vehicle control apparatus may remain in the sleep state. When the auxiliary battery is discharged by a predetermined percentage or more in the state in which the auxiliary charge is completed, the battery sensor may request auxiliary charge again. The predetermined percentage may be 5%. For example, in the case where the auxiliary charge of the auxiliary battery is finally completed in the SOC value of 75%, the battery sensor may request auxiliary charge again to make an entrance to the auxiliary charge again when the SOC value of the auxiliary battery is 70%.

The vehicle control apparatus may transfer whether the trunk or hood of the vehicle is closed or not to the battery sensor so that the auxiliary battery requests auxiliary charge only when the SOC value of the high-voltage battery of the vehicle is higher than or equal to the reference level and the trunk or hood of the vehicle is closed. The vehicle control apparatus may perform control so that the battery sensor does not request auxiliary charge when the trunk of the vehicle is open, the hood of the vehicle is open, or the SOC value of the high-voltage battery of the vehicle is lower than the reference level. The vehicle control apparatus may block wake-up by an unnecessary request for auxiliary charge and may thus reduce unnecessary power consumption of the auxiliary battery.

Figure 8:
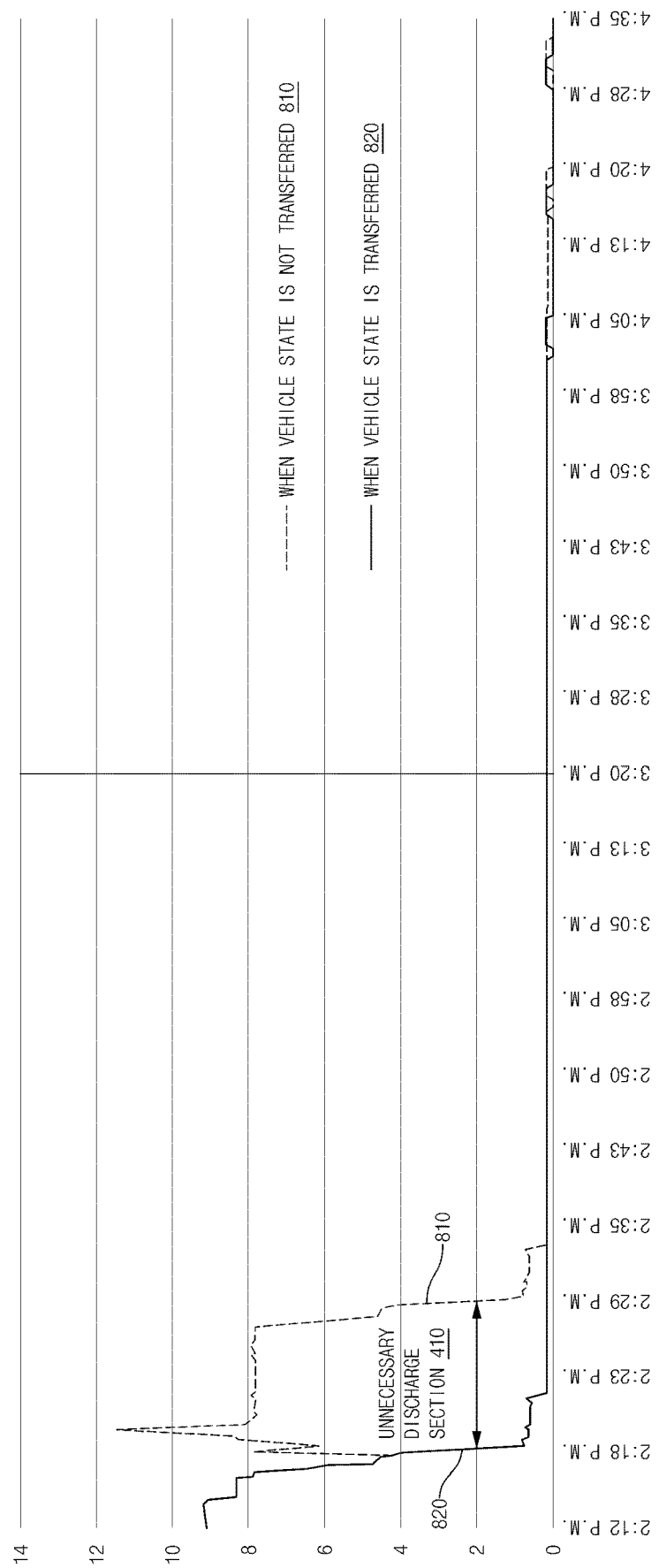
FIG. 8 is a view exemplarily illustrating power consumption of the auxiliary battery when auxiliary charge is requested in the state in which the trunk of the vehicle is open, the hood of the vehicle is open, or the remaining capacity of the high-voltage battery of the vehicle is lower than the reference level according to an exemplary embodiment of the present disclosure.

FIG. 8 is a view exemplarily illustrating power consumption of the auxiliary battery when auxiliary charge is requested in the state in which the trunk of the vehicle is open, the hood of the vehicle is open, or the remaining capacity of the high-voltage battery of the vehicle is lower than the reference level according to an exemplary embodiment of the present disclosure.

When the state of the vehicle is not transferred to the battery sensor, the vehicle control apparatus may be woken up by a request for auxiliary charge even in the state in which the trunk of the vehicle is open, the hood of the vehicle is open, or the remaining capacity of the high-voltage battery of the vehicle is lower than the reference level. When the state of the vehicle is not transferred to the battery sensor, the vehicle control apparatus may be woken up so that an unnecessary discharge section 410 may occur as shown in curve 810.

When the state of the vehicle is transferred to the battery sensor, the vehicle control apparatus may control the battery sensor so as not to request auxiliary charge from the vehicle control apparatus in the case where the trunk of the vehicle is open, the hood of the vehicle is open, or the remaining capacity of the high-voltage of the vehicle is lower than the reference level. When the state of the vehicle is transferred to the battery sensor, the unnecessary discharge section 410 may be removed as shown in curve 820 by preventing the vehicle control apparatus from being woken up. Accordingly, unnecessary power consumption of the auxiliary battery of the vehicle may be reduced by blocking a request for auxiliary charge by the battery sensor and wake-up of the vehicle control apparatus in the state in which the trunk of the vehicle is open, the hood of the vehicle is open, and the remaining capacity of the high-voltage battery of the vehicle is lower than the reference level.

FIG. 9 is a view exemplarily illustrating conditions for start and stop of auxiliary charge according to an exemplary embodiment of the present disclosure.

In the current auxiliary charge control logic 910, an entrance to auxiliary charge may be made in consideration of the SOC value of the auxiliary battery and the state of the vehicle. In the current auxiliary charge control logic 910, the entrance to the auxiliary charge may be made when the ignition is turned off or when an entrance condition is satisfied after a check on the state of the auxiliary battery through wake-up every 24 hours after charging.

The entrance condition in the current auxiliary charge control logic 910 may include the state in which the SOC value of the main battery is 20% or more. The entrance condition in the current auxiliary charge control logic 901 may include the state in which all doors of the vehicle, the hood of the vehicle, the trunk of the vehicle, and the sunroof of the vehicle are closed. The entrance condition in the current auxiliary charge control logic 910 may include the state in which the SOC value of the auxiliary battery is 85% or less or the voltage of the auxiliary battery is 12.7 V or less.

In the current auxiliary charge control logic 910, the auxiliary charge may be performed for a specified operating time. The operating time may be determined depending on the SOC value of the auxiliary battery. When the SOC value of the auxiliary battery exceeds 80%, the operating time may be up to 20 minutes. When the SOC value of the auxiliary battery is 80% or less, the operating time may be up to 60 minutes.

In the regular auxiliary charge control logic 920, whether to enter auxiliary charge may be determined in consideration of the SOC value of the auxiliary battery and the state of the vehicle. In the regular auxiliary charge logic 920, the battery sensor may request auxiliary charge from the ICU when the SOC value of the auxiliary battery is 80% or less. The ICU may determine whether the state of the vehicle corresponds to a state in which an entrance to auxiliary charge is possible and may make the entrance to the auxiliary charge when the state of the vehicle corresponds to the state in which the entrance to the auxiliary charge is possible.

The vehicle control apparatus may receive a request for auxiliary charge from the battery sensor in the case where the SOC value of the auxiliary battery is 80% or less and a re-entry flag is turned off. In the case where the SOC value of the auxiliary battery is 80% or less and the re-entry flag is turned on, the vehicle control apparatus may receive the request for the auxiliary charge from the battery sensor when the auxiliary battery is discharged by 5% or more, compared to the SOC value of the auxiliary battery at the end time of the previous auxiliary charge.

The vehicle control apparatus may identify the state of the vehicle. The vehicle control apparatus may provide the state of the vehicle to the auxiliary battery. The vehicle control apparatus may provide the state of the vehicle to the auxiliary battery to receive the request for the auxiliary charge only when the state of the vehicle corresponds to the state in which the auxiliary charge is possible.

The vehicle control apparatus may perform the auxiliary charge for the operating time and may end the auxiliary charge. The vehicle control apparatus may end the auxiliary charge when LIN communication of the battery sensor is turned off, the SOC value of the auxiliary battery reaches 92%, or the maximum charging limit time set for each charging state section is reached.

Figure 10:
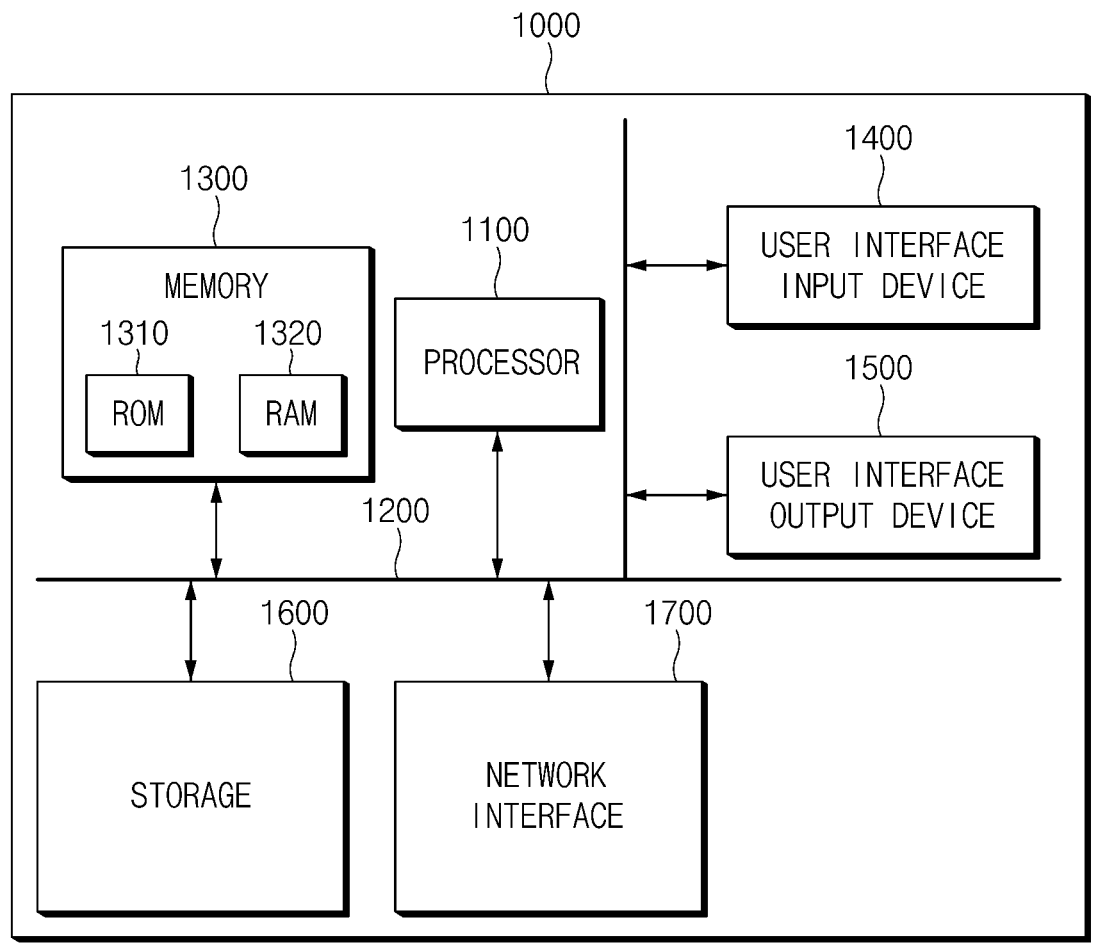
FIG. 10 illustrates a computing system according to an exemplary embodiment of the present disclosure.

FIG. 10 illustrates a computing system according to an exemplary embodiment of the present disclosure.

Referring to FIG. 10, the computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to an exemplary embodiment of the present disclosure, the vehicle control apparatus may receive the state of the vehicle in advance and may postpone the request for the auxiliary charge when the trunk of the vehicle is open, the hood of the vehicle is open, or the remaining capacity of the high-voltage battery of the vehicle is low.

Accordingly, the present disclosure may reduce unnecessary power consumption of the auxiliary battery of the vehicle by blocking the request for the auxiliary charge by the battery sensor and wake-up of the vehicle control apparatus in the state in which the trunk of the vehicle is open, the hood of the vehicle is open, and the remaining capacity of the high-voltage battery of the vehicle is low.

Furthermore, the present disclosure may provide various effects that are directly or indirectly recognized.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling a vehicle, the apparatus comprising:
   a memory;
   a network interface; and
   a processor,
   wherein the processor is configured to:
     transfer information related to a state of the vehicle to a battery sensor configured to measure a state of charge of an auxiliary battery of the vehicle; and
     control the battery sensor so that the battery sensor determines whether to transfer a request for auxiliary charge of the auxiliary battery, according to the information related to the state of the vehicle, and
   wherein the processor is further configured to:
     determine an unnecessary request for auxiliary charge by the battery sensor when the battery sensor requests for the auxiliary charge in a state that the auxiliary charge is not able to be performed and prohibit transmission of a battery charge signal, and
     block wake-up performed by the unnecessary request for the auxiliary charge to reduce power consumption of the auxiliary battery by performing the wake-up,
   wherein the state that the auxiliary charge is not able to be performed includes a state in which a trunk of the vehicle is open, or a state in which a hood of the vehicle is open.

2. The apparatus of claim 1, wherein the information related to the state of the vehicle includes a state of the trunk of the vehicle, a state of the hood of the vehicle, and a state of remaining capacity in a state of charge of a main battery of the vehicle.

3. The apparatus of claim 1, wherein the processor is configured to control the battery sensor so that the battery sensor postpones transferring the request for the auxiliary charge when the trunk of the vehicle is open, the hood of the vehicle is open, or remaining capacity of a main battery of the vehicle is lower than a reference level which is a minimum level at which the auxiliary charge is possible.

4. The apparatus of claim 1, wherein the processor is configured to determine whether the state of charge of the auxiliary battery of the vehicle is less than or equal to a minimum threshold value, whether the trunk of the vehicle is closed, whether the hood of the vehicle is closed, and whether a state of charge of a main battery of the vehicle is higher than or equal to a reference level which is a minimum threshold value at which the auxiliary charge is possible, and
   wherein the reference level is 20%.

5. The apparatus of claim 1, wherein the processor is configured:
   to receive information related to a state of charge from an integrated central control unit (ICU); and
   to control an integrated charging control unit (ICCU) to start the auxiliary charge of the auxiliary battery of the vehicle by controlling the ICCU using the information related to the state of charge.

6. The apparatus of claim 1, wherein the processor is configured to transfer the information related to the state of the vehicle to the battery sensor to block transfer of the request for the auxiliary charge to an ICU or the apparatus when the trunk of the vehicle is open, the hood of the vehicle is open, or a state of charge of a main battery of the vehicle is lower than a reference level.

7. The apparatus of claim 1, wherein through current auxiliary charge control logic, the processor makes an entrance to the auxiliary charge when an ignition of the vehicle is turned off or when an entrance condition is satisfied after a check on a state of the auxiliary battery through wake-up every 24 hours after charging.

8. The apparatus of claim 7, wherein the entrance condition in the current auxiliary charge control logic includes a state in which all doors of the vehicle, the hood of the vehicle, the trunk of the vehicle, and a sunroof of the vehicle are closed and a state in which remaining capacity of a main battery of the vehicle is higher than or equal to a reference level which is a minimum value for the entrance to the auxiliary charge, and
   wherein the reference level is 20%.

9. The apparatus of claim 1, wherein the processor is configured:
   to receive the request for the auxiliary charge from the battery sensor when the state of charge of the auxiliary battery is 80% or less and a re-entry flag is turned off; and
   to receive the request for the auxiliary charge from the battery sensor when the state of charge of the auxiliary battery is 80% or less, the re-entry flag is turned on, and the auxiliary battery is discharged by 5% or more, compared to the state of charge of the auxiliary battery at an end time point of previous auxiliary charge.

10. The apparatus of claim 1, wherein the processor is configured to end the auxiliary charge when communication of the battery sensor is turned off, the state of charge of the auxiliary battery reaches 92%, or a maximum charging limit time set for each charging state section is reached.

11. A method for controlling a vehicle, the method comprising:
   transferring, by a processor of a vehicle control apparatus, information related to a state of the vehicle to a battery sensor configured to measure a state of charge of an auxiliary battery of the vehicle;
   controlling, by the processor, the battery sensor to determine whether to transfer a request for auxiliary charge of the auxiliary battery, according to the information related to the state of the vehicle;
   determining, by the processor, an unnecessary request for the auxiliary charge by the battery sensor when the battery sensor requests for the auxiliary charge in a state that the auxiliary charge is not able to be performed; and
   blocking, by the processor, wake-up performed by the unnecessary request for the auxiliary charge to reduce power consumption of the auxiliary battery by performing the wake-up and prohibiting transmission of a battery charge signal,
   wherein the state that the auxiliary charge is not able to be performed includes a state in which a trunk of the vehicle is open, or a state in which a hood of the vehicle is open.

12. The method of claim 11, wherein the information related to the state of the vehicle includes a state of the trunk of the vehicle, a state of the hood of the vehicle, and remaining capacity in a state of charge of a main battery of the vehicle.

13. The method of claim 11, wherein the processor is configured to control the battery sensor so that the battery sensor postpones transferring the request for the auxiliary charge when the trunk of the vehicle is open, the hood of the vehicle is open, or remaining capacity of a main battery of the vehicle is lower than a reference level which is a minimum level at which the auxiliary charge is possible.

14. The method of claim 11, wherein the processor is configured to determine whether the state of charge of the auxiliary battery of the vehicle is less than or equal to a minimum threshold value, whether the trunk of the vehicle is closed, whether the hood of the vehicle is closed, and whether a state of charge of a main battery of the vehicle is higher than or equal to a reference level which is a minimum threshold value at which the auxiliary charge is possible.

15. The method of claim 11, wherein the processor is configured:
   to receive information related to a state of charge from an integrated central control unit (ICU); and
   to control an integrated charging control unit (ICCU) to start the auxiliary charge of the auxiliary battery of the vehicle by controlling the ICCU using the information related to the state of charge.

16. The method of claim 11, wherein the processor is configured to transfer information related to the state of the vehicle to the battery sensor to block transfer of the request for the auxiliary charge to an ICU or the apparatus when the trunk of the vehicle is open, the hood of the vehicle is open, or remaining capacity of a main battery of the vehicle is lower than a reference level.

17. The method of claim 11, wherein through current auxiliary charge control logic, the processor makes an entrance to the auxiliary charge when an ignition of the vehicle is turned off or when an entrance condition is satisfied after a check on a state of the auxiliary battery through wake-up every 24 hours after charging.

18. The method of claim 17, wherein the entrance condition in the current auxiliary charge control logic includes a state in which all doors of the vehicle, the hood of the vehicle, the trunk of the vehicle, and a sunroof of the vehicle are closed and a state in which a state of charge of a main battery of the vehicle is higher than or equal to a reference level which is a minimum value for the entrance to the auxiliary charge.

19. The method of claim 11, wherein the processor is configured:
   to receive the request for the auxiliary charge from the battery sensor when the state of charge of the auxiliary battery is 80% or less and a re-entry flag is turned off; and
   to receive the request for the auxiliary charge from the battery sensor when the state of charge of the auxiliary battery is 80% or less, the re-entry flag is turned on, and the auxiliary battery is discharged by 5% or more, compared to the state of charge of the auxiliary battery at an end time point of previous auxiliary charge.

20. The method of claim 11, wherein the processor is configured to end the auxiliary charge when communication of the battery sensor is turned off, the state of charge of the auxiliary battery reaches 92%, or a maximum charging limit time set for each charging state section is reached.

* * * * *